United States Patent
Gupta et al.

(10) Patent No.: US 11,392,436 B2
(45) Date of Patent: Jul. 19, 2022

(54) ADVANCED FILE RECOVERY METHOD FOR FLASH MEMORY

(71) Applicant: WESTERN DIGITAL TECHNOLOGIES, INC., San Jose, CA (US)

(72) Inventors: Ankit Gupta, Karnataka (IN); Narendhiran Chinnaanangur Ravimohan, Karnataka (IN); Abhinand Amarnath, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 100 days.

(21) Appl. No.: 16/837,889

(22) Filed: Apr. 1, 2020

(65) Prior Publication Data
US 2021/0311880 A1 Oct. 7, 2021

(51) Int. Cl.
*G06F 11/00* (2006.01)
*G06F 11/07* (2006.01)
*G06F 11/14* (2006.01)

(52) U.S. Cl.
CPC ........ *G06F 11/073* (2013.01); *G06F 11/1446* (2013.01)

(58) Field of Classification Search
CPC .............. G06F 11/073; G06F 11/1446; G06F 11/1458; G06F 11/1469; G06F 11/1471; G06F 16/13; G06F 16/11; G06F 16/162
See application file for complete search history.

(56) References Cited

U.S. PATENT DOCUMENTS

| 8,069,284 | B2 | 11/2011 | Oh |
| 9,830,327 | B2 | 11/2017 | Zhuang et al. |
| 2003/0101327 | A1* | 5/2003 | Beck .................. G06F 12/1009 711/206 |
| 2003/0133348 | A1* | 7/2003 | Wong ................. G11C 16/3431 365/222 |
| 2013/0018852 | A1* | 1/2013 | Barton ................. G06F 16/162 707/692 |
| 2014/0181369 | A1* | 6/2014 | Horn ..................... G06F 3/0638 711/103 |

(Continued)

FOREIGN PATENT DOCUMENTS

| CN | 104217174 A | 12/2014 |
| CN | 108062357 A | 5/2018 |
| KR | 20100013861 A | 2/2010 |

*Primary Examiner* — Joseph D Manoskey
(74) *Attorney, Agent, or Firm* — ArentFox Schiff LLP

(57) ABSTRACT

Aspects of a storage device including a memory and a controller are provided which allow for data associated with a deleted file to be recovered from the memory when the data is overwritten by a new file at the same logical address. To locate the data, the controller may identify a logical address associated with the data based on a directory entry associated with a FAT. The controller may determine a physical location of the data associated with the logical address based on one or more control entries in a L2P mapping table, such as a previous control entry in the table. The controller may also determine the physical location based on a hot count associated with the previous control entry. After the physical location is determined, the controller may associate a new logical address with the physical location of the data to recover the deleted file.

19 Claims, 8 Drawing Sheets

(56) References Cited

U.S. PATENT DOCUMENTS

| | | | |
|---|---|---|---|
| 2016/0283160 A1* | 9/2016 | Trika | G06F 12/0246 |
| 2017/0220427 A1 | 8/2017 | Fu et al. | |
| 2018/0189187 A1* | 7/2018 | Cheung | G06F 3/0604 |
| 2020/0065198 A1* | 2/2020 | Reed | G06F 11/1469 |
| 2020/0250050 A1* | 8/2020 | Koester | G06F 11/1469 |
| 2020/0327066 A1* | 10/2020 | Li | G06F 3/064 |

\* cited by examiner

ADVANCED FILE RECOVERY METHOD FOR FLASH MEMORY

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

The flash storage device may also include a file system that maps control information and data to different files. The file system may also track whether files are in use, i.e. deleted, by a user of a host device. Generally, when a file is accidentally deleted by the user, file recovery software of the host device may attempt to recover the file by parsing the directory entries of the file system for information including a cluster (e.g. one or more logical sectors) where the file data resides and a length of the file data. However, if the host writes new data to the corresponding cluster or logical address, the original file may not be recoverable by the host device using this approach.

SUMMARY

One aspect of a storage device is disclosed herein. The storage device includes a memory storing data associated with a deleted file, and a controller. The controller is configured to identify a logical address associated with the data and determine a physical location of the data associated with the logical address based on one or more control entries in a logical-to-physical (L2P) mapping table. The controller is further configured to associate a new logical address with the physical location of the data to recover the deleted file.

Another aspect of a storage device is disclosed herein. The storage device includes a memory storing data associated with a deleted file, and a controller. The controller is configured to identify a logical address associated with the data based on a directory entry associated with a File Allocation Table (FAT), and to determine a physical location of the data associated with the logical address based on one or more control entries in a L2P mapping table. The one or more control entries in the L2P mapping table include a current control entry associated with the logical address and a previous control entry, and the controller is further configured to determine the physical location of the data based on the previous control entry. The controller is further configured to associate a new logical address with the physical location of the data to recover the deleted file.

A further aspect of a storage device is disclosed herein. The storage device includes a memory storing data associated with a deleted file, and a controller. The controller is configured to identify a logical address associated with the data based on a directory entry associated with a FAT, and to determine a physical location of the data associated with the logical address based on one or more control entries in a L2P mapping table. The one or more control entries in the L2P mapping table include a current control entry associated with the logical address and a previous control entry, and the controller is further configured to determine the physical location of the data based on the previous control entry and based on a hot count associated with the previous control entry. The controller is further configured to associate a new logical address with the physical location of the data to recover the deleted file.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
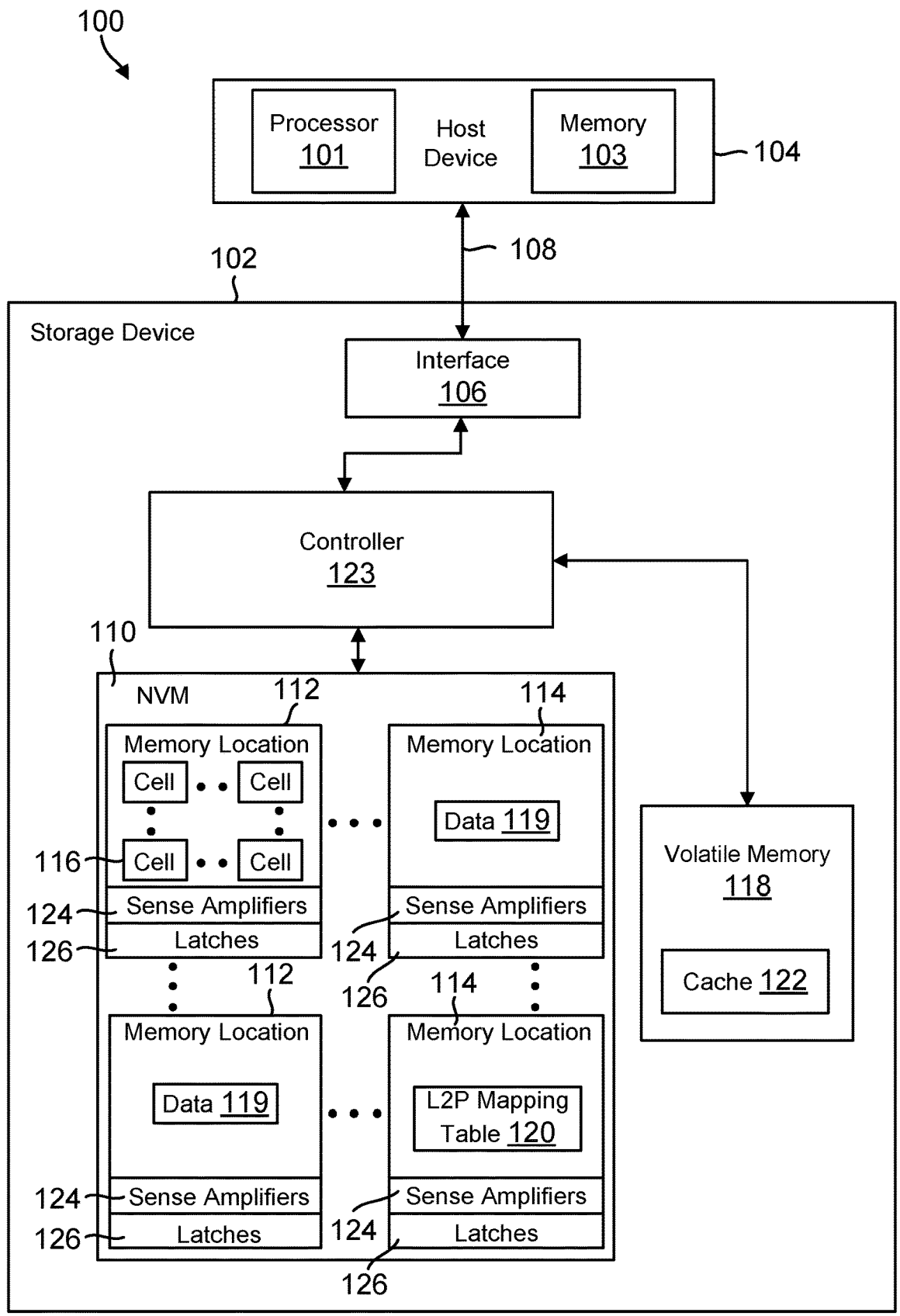
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When attempting to recover a file accidentally deleted by a user, a host device may retrieve data from the file system by manually parsing directory entries for the file entry corresponding to the deleted file. For example, in exFAT file systems, the host device may identify file entries that have a reset "In Use" bit indicating those file entries are invalidated (e.g. deleted), and if an invalidated file entry corresponds to the deleted file, the host device may extract the parameters from the file entry including a pointer to a cluster where the file data resides and a length of the file data in order to recover the data. However, when a file entry is invalidated, the file system may relocate the corresponding cluster of that file entry to a vacant or free cluster pool, allowing the host device to write new data associated with a different file to that free cluster. If the host device writes new data to that cluster, the host device may not be able to recover the deleted file using the above approach, since the old data has been overwritten in that cluster.

To address this problem, the present disclosure allows a controller of the storage device to confirm from the file system whether the old data has been overwritten, and in such case, the present disclosure allows the controller to recover the invalidated data corresponding to the deleted file directly from flash memory. When confirming whether the deleted data has been overwritten, the controller may parse the file system to identify the directory entry corresponding to the deleted file. For instance, the controller may identify parameters including sector size, cluster size, addresses for file indexing and cluster indexing tables, and a format of file entries created for each type of file, which may vary depending on the type of host device or file system, and the controller may locate the file entry based on these parameters. After finding the file entry, the controller may identify the cluster or logical address corresponding to that file entry, and the controller may check whether the data corresponding to the deleted file is still located at the same logical address and has not been overwritten, e.g., based on a signature byte or a checksum comparison. If the controller determines that the data corresponding to the deleted file has not been overwritten at the logical address, the controller may flag the file entry as undeleted to recover the file (e.g. by toggling an in use bit in exFAT).

Otherwise, if the controller determines the data corresponding to the deleted file has been overwritten, the controller may recover the overwritten or invalidated data by directly reading the flash memory. For example, the controller may store L2P mappings of the data in a group address table (GAT), which may indicate the previous physical locations where the data associated with that logical address was stored. The controller may search (e.g. backtrack) through the GAT to find the previous physical location(s) associated with the logical address, and after identifying the previous physical location, the controller may recover the invalidated data from that previous physical location. In another example, after identifying the previous location (e.g. a previous block) through the GAT, the controller may determine whether that previous block has been erased by checking a hot count associated with that block. The hot count may indicate a number of erasures that have occurred for a particular physical location (e.g. a block). If the hot count associated with the previous block indicates that block has not been erased since the time the data associated with the deleted file was stored, the controller may recover the data from that physical location. In a further example, when the controller determines that a physical location is to be erased (e.g. after meeting a compaction threshold or in response to an erase command by the host device), the controller may write the data to a new physical location for recovery such as an overprovisioned block before performing the erasure. As a result, the controller may recover the invalidated data from the overprovisioned block, e.g. when the hot count indicates the previous physical location had been erased. The controller may also store L2P mappings in overprovisioned blocks for the storage device to access when recovering the data from previous physical locations.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103.

The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be single-level cells, multiple-level cells, triple-level cells, quadruple-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table may also be referred to as a GAT. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM. Additionally, a table of L2P mapping updates, which may be referred to as a GAT delta, may store updated mappings of logical addresses to new physical addresses in the volatile memory 118 (e.g. cache 122) in response to data overwrites received from the host device 104, and the controller 123 of the storage device may flush or merge these L2P mapping updates to the L2P mapping table 120 at regular intervals (e.g. when GAT delta is full).

Figure 2:
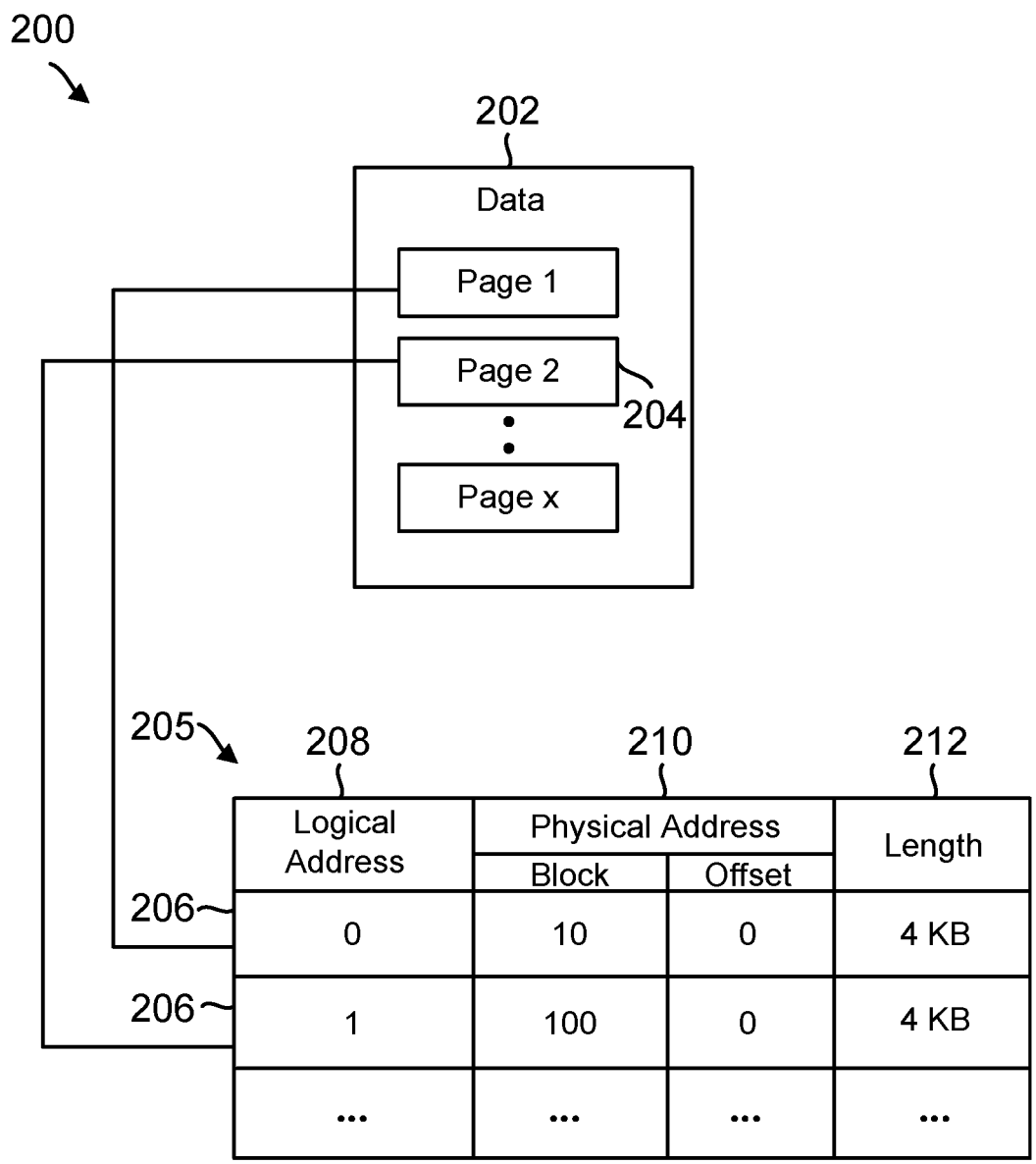
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 may store data temporarily as it is being written to, or read from, the NVM 110. For example, the cache 122 may store data received from the host device 104 until a certain length of data is accumulated for writing to one or more pages of the memory locations 112. Similarly, the cache 122 may store data read from the NVM until a certain length of data is accumulated for transferring to the host device.

The cache 122 may also include entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
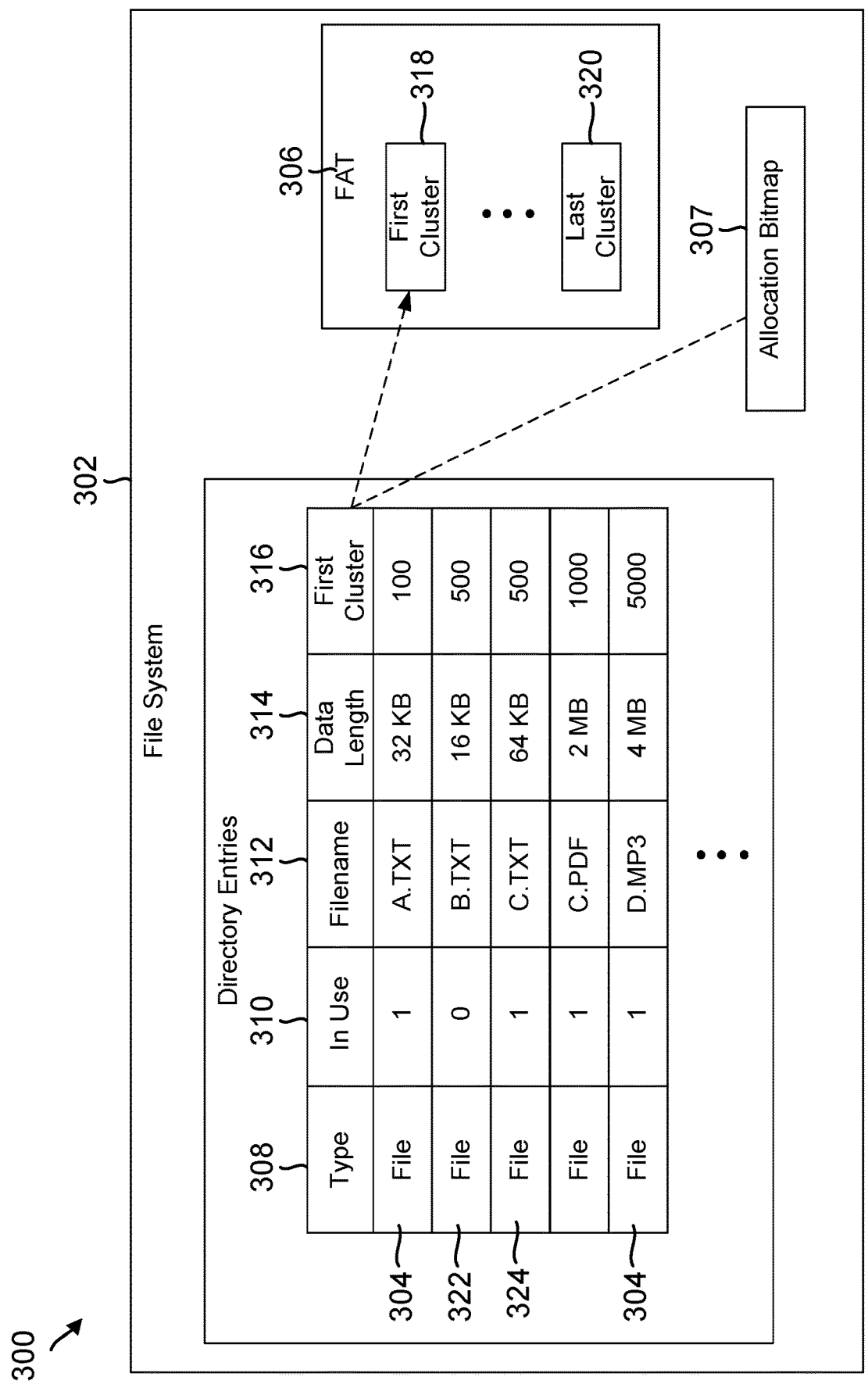
FIG. 3 is a conceptual diagram illustrating an example of a file system of the storage device of FIG. 1.

The data 119 in the NVM 110 may be associated with one or more files. FIG. 3 illustrates an example 300 of a file system 302 of the storage device. The file system 302 may include directory entries 304, a FAT 306, and an allocation bitmap 307. The directory entries 304 may include file entries corresponding to data (e.g. data 119 of FIG. 1) of different files stored in the flash memory (e.g. NVM 110 of FIG. 1). For example, each directory entry may include a type 308 of the directory entry (e.g. a file), an in use flag 310 (e.g. a bit) indicating whether the file is in use or not (e.g. deleted), a filename 312 indicating a name of the file (along with a hash value for the filename in exFAT), a data length 314 indicating a length of the data associated with the filename, and a first cluster 316 indicating the first one or more logical sectors in which the data is stored. For example, the file system 302 may be configured such that each cluster corresponds to one logical address 208, with one sector per cluster and 512 bytes per sector. The FAT 306 may include a linked list of clusters 318, 320 associated with each directory entry 304 that indicate the clusters in which each file data is stored. For example, first cluster 316 of a directory entry 304 may correspond to first cluster 318 in the FAT 306, which is linked all the way until last cluster 320 for a total cluster size (or range of logical addresses) spanning data length 314. The allocation bitmap 307 may include an allocation status of individual clusters in the FAT 306 which indicates whether each cluster is occupied or free. The allocation bitmap 307 may be part of the FAT 306 or separate from the FAT 306 (e.g. in exFAT file systems).

As illustrated in the example of FIG. 3, when the host device 104 permanently deletes a file from the storage device 102 (such that it is unrecoverable from a "recycle bin" directory), the file system 302 may be updated to reflect the deleted file. For instance, when the host device deletes the file named "B.TXT", the directory entry 322 corresponding to that filename 312 may be updated to reset the in use flag 310 (e.g. to 0). Moreover, the corresponding clusters 316, 318, 320 or logical addresses 208 associated with directory entry 322 (e.g. LBA 500) may be freed in allocation bitmap 307. As a result, the host device may overwrite the freed cluster(s) with a new file named "C.TXT", which may create a new directory entry 324 associated with the same logical address (e.g. LBA 500). In such case, if the host device 104 attempts to undelete the file "B.TXT" by setting back the in use flag 310 for directory entry 322, the file data may not be recoverable using this approach since the first cluster 316 is no longer correct (LBA 500 now corresponds to "C.TXT" after the overwriting).

Accordingly, the present disclosure allows the controller 123 to recover the deleted file (e.g. the data corresponding to "B.TXT") in such cases where overwriting has occurred. To determine whether such overwriting has occurred, the controller 123 of the storage device 102 may first parse the directories of the file system 302 to identify the file entry for the corresponding file to be recovered. For example, the controller may read the boot sector of the file system block, which contains various parameters that may be used to read the file system. Such parameters may include a file system type such as exFAT, a root directory offset (e.g. a cluster address for the start of a root directory including directory entries 304 for files or subdirectories), a FAT offset indicating the starting address for FAT 306, the number of sectors per cluster, and the number of bytes per sector. Once the controller finds the root directory based on these parameters, the controller may search through the directory entries 304 to find the file entry corresponding to the deleted file (e.g. directory entry 322). For example (e.g. in exFAT), the controller may perform a rapid search by calculating a hash value of the filename to be recovered, comparing it with the hash values associated with the filenames 312 of each directory entry, and if there is a match, confirming by checking the full filename 312. Alternatively (e.g. in other file systems), the controller may perform the search by checking each individual filename for a match.

After the controller 123 finds the file entry (e.g. directory entry 322 corresponding to "B.TXT") in file system 302, the controller may parse that directory entry to identify the cluster(s) or logical address(es) of the data associated with the deleted file. For example, the controller may extract the starting LBA for the file data (i.e. first cluster 316, e.g. LBA 500 in FIG. 3) and the size of the file (i.e. data length 314, e.g. 16 KB in FIG. 3). Then, the controller may check whether the file data is present and not overwritten in the extracted logical addresses. For example, the controller may determine whether the first cluster 316 of directory entry 322 still points to data corresponding to "B.TXT" by comparing a size of the file with the clusters currently allocated to the file. Alternatively, the controller may determine whether the file data is overwritten in other ways, e.g., based on a checksum or signature byte at a beginning or end of the file (i.e. in metadata for the file).

As an example, the controller may determine whether the data for "B.TXT" is overwritten by comparing the data length 314 in the directory entry 322 to a total size of the clusters 318, 320 associated with first cluster 316. The controller may obtain the total cluster size, for instance, by searching through the linked list of clusters in FAT 306 until it reaches the last cluster 320, confirming that the cluster is the last allocated cluster (e.g. by checking if the next byte after the last valid byte is set to zero), and determining the total size based on the number of clusters. The controller may then compare the file data length (e.g. from data length 314 of directory entry 322) with the total cluster size to determine if they are equal. If the values are equal, then the controller may determine that the file data has not been overwritten at those cluster(s). Otherwise, if the values are not equal, the controller may determine that an overwriting has occurred.

In one possible result, the controller may determine that the file data has not been overwritten, e.g. based on the size comparison discussed above or otherwise. In such case, the controller may update the corresponding file entry so that the file is visible to the host device 104 upon subsequent initialization of the storage device 102. For example, in the event the file "B.TXT" has not been overwritten at LBA 500, the controller 123 may toggle the in use flag 310 (e.g. set the bit back to 1) for directory entry 322 in order to undelete the file. However, in some cases, the host device may not re-scan the root directory page for directory entries until after a power cycle. As a result, the undeleted file corresponding to directory entry 322 may not be visible to the host device 104 until a refresh, an unmounting or mounting of the storage device, or some other power cycle has occurred. Thus, when the controller sets the in use flag 310 of the recovered file entry, such host devices may correctly view the recovered file after a power cycle has completed.

In other cases, the controller may determine that the file data is not present, e.g. based on the size comparison discussed above or otherwise, since the data was overwritten, erased or replaced with partial data. For instance, as illustrated in FIG. 3, the controller may determine that the 16 KB data corresponding to "B.TXT" at LBA 500 was invalidated as a result of the host device writing new 64 KB data for "C.TXT" at the same logical address in directory entry 324. In such case, the controller may attempt to recover the deleted file directly from the NVM 110 by searching through corresponding control block entries in the flash memory for the same logical address. Each control block entry may be a L2P mapping entry of a L2P mapping table or GAT (e.g. entries 206 of L2P mapping table 205) that indicates the physical location of data for a particular logical address. The controller may read the file data from these physical locations if they have not been compacted or erased, e.g. when the amount of invalid data in a physical block is less than a compaction threshold.

Figure 4:
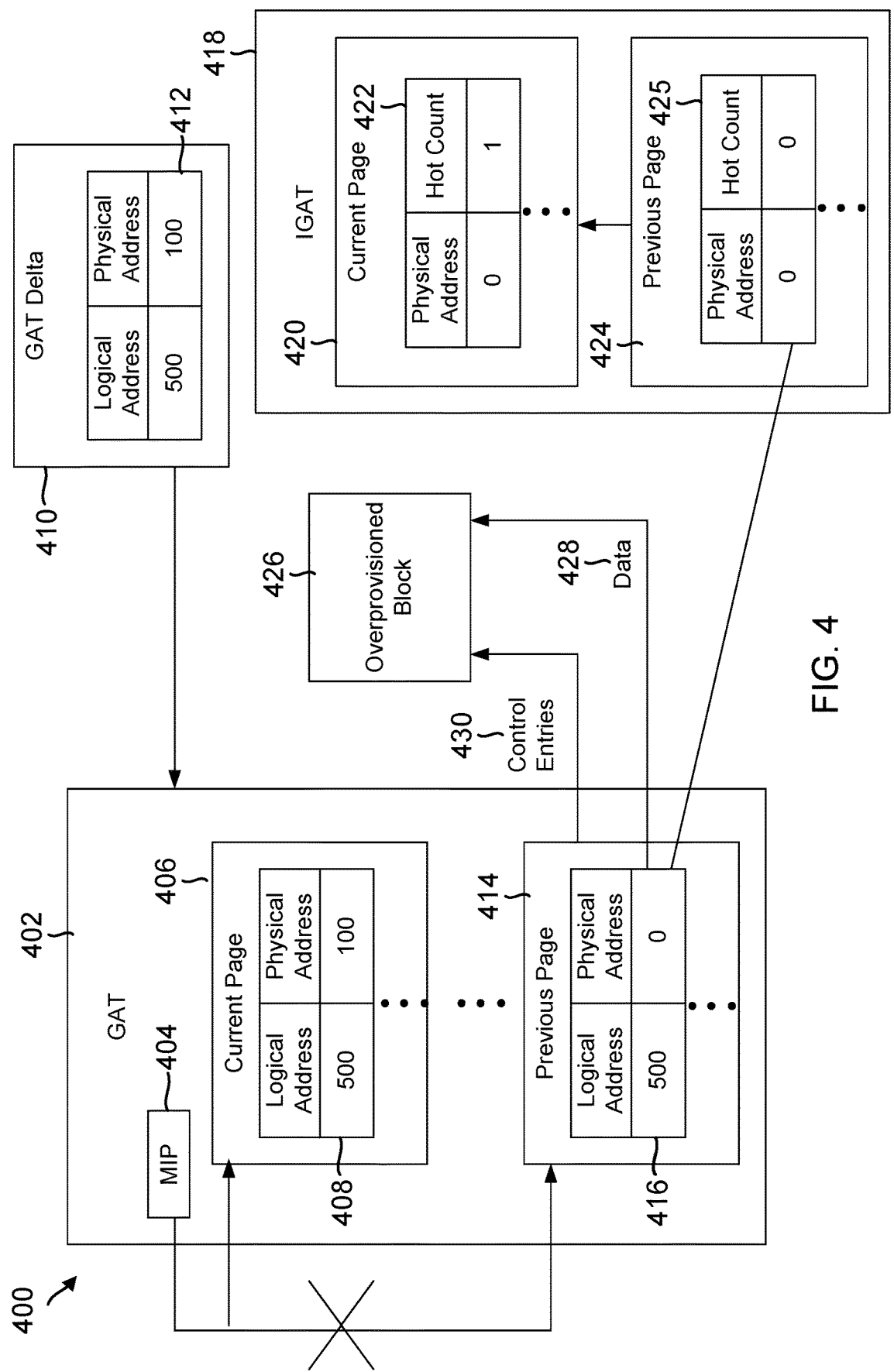
FIG. 4 is a conceptual diagram illustrating an example of a data overwrite, hot count update, and overprovisioning by the storage device of FIG. 1.

FIG. 4 illustrates an example 400 of a GAT 402 that the controller may use to search for physical blocks in flash memory allocated to a particular logical address or cluster that contains data of a deleted file. The GAT 402 may correspond to L2P mapping table 120, 205 in FIGS. 1 and 2. The GAT may include a master index page (MIP) 404 that points to a current page 406 of control entries 408 (e.g. entries 206) for data stored in the NVM 110. While FIG. 4 illustrates only one page 406 with one control entry 408 for ease of illustration, it should be understood that the MIP 404 may point to multiple pages 406 each including multiple control entries 408. When the controller 123 reads from and writes data to the NVM 110, the controller may access the MIP 404 to find each page 406 of control entries 408 for translating logical addresses to physical addresses.

The GAT 402 may be flushed or merged with L2P mapping updates, or updated control entries, from GAT delta 410. GAT delta 410 may be a table or other data structure in the volatile memory 118 (or NVM 110) that temporarily stores updated control entries 412, or updated mappings of new physical addresses to existing logical addresses, which are generated by the controller, e.g. in response to data overwrites. The controller may store the updated control entries 412 in blocks designated for these entries, e.g. active control blocks. While FIG. 4 illustrates only one updated control entry 412 in GAT delta 410 for ease of illustration, it should be understood that multiple updated control entries 412 may be present in GAT delta 410.

The host device 104 may delete a file including data associated with a particular logical address as described above with respect to FIG. 3. Afterwards, if the host device overwrites the data by sending a write command including new data to be stored at that same logical address, the controller may generate an updated L2P mapping and write it to a new physical location in the NVM 110. The updated control entries 412 may include the current LBA and physical location (e.g. a meta-block or physical block address and page number, die, and chip number), which the controller may use to read the data in response to read commands from the host device. Once a substantial number of updated control entries 412 become present in GAT delta 410 or the block becomes full, e.g. from numerous data overwrites, the controller may flush the data from GAT delta 410 to a new page of the GAT 402.

However, as flash memory erasures are performed at the block-level, old pages of GAT 402 are not individually erased when new GAT pages are formed. Rather, the controller may sequentially write new pages of GAT including GAT delta 410 to the GAT 402, with the updated control entries 412 masked onto the previous GAT page, and with the MIP 404 updated to point to the most current GAT page. For example, as illustrated in FIG. 4, the GAT 402 may include a previous page 414 with multiple control entries 416, including one in which LBA 500 is associated with an old physical location (e.g. physical address 0). Subsequently in response to a data overwrite, LBA 500 may be associated with a new physical location (e.g. physical address 100) as indicated in updated control entry 412, and the GAT delta 410 including the updated control entry 412 may later be flushed to the GAT 402. Afterwards, the MIP 404 may be updated to no longer point to the previous page 414 and instead point to the current page 406 including the updated physical location (e.g. physical address 100), with the previous page 414 remaining in the GAT block.

Accordingly, based on the above version controlling of GAT pages, the controller 123 may identify the physical block allocated to a particular LBA prior to the data overwrite. The controller may find the previous GAT page containing the same logical address for a deleted file by reading the previous GAT pages 414 pointed by the MIP 404. The controller may backtrack to the GAT page indicating where the physical location associated with that logical address changed for the first time. For example, as illustrated in FIG. 4, the controller may backtrack through the previous GAT pages 414 until it finds the control entry 416 (e.g. the previous control entry) indicating the previous physical location of the deleted file associated with the identified logical address (e.g. physical address 0 for LBA 500).

Once the controller identifies the previous physical block from the control entry 416, the controller may check whether the data is recoverable by determining whether the previous location has been erased, e.g., based on a hot count corresponding to the previous physical location. As used herein, a hot count is an indicator of a number of erasures that has occurred for a particular physical block. Each physical block's hot count may be a field of an IGAT 418, which may be a separate table or other data structure from the GAT 402 as illustrated in FIG. 4. Alternatively, the hot counts or IGAT may be part of the GAT 402. When the controller erases a particular physical block, the controller may update the hot count for that physical block to reflect the erase count. For instance, a hot count of 0 (or another value) for a block may indicate the block has not yet been erased, a hot count of 1 (or another value) for a block may indicate the block was erased once, etc. Hot count updates may be flushed and merged into a new IGAT page in the NVM 110 at the same time as GAT delta. Thus, each IGAT page with associated hot counts may respectively correspond to a GAT page with associated control entries. For example, a current page 420 of IGAT 418 may include a current hot count 422 for a physical block that maps to a corresponding control entry 408 of a current page 406 in GAT 402. Similarly, a previous page 424 of IGAT 418 may include a previous hot count 425 for a physical block that maps to a corresponding control entry 416 of a previous page 414 in GAT 402.

Accordingly, once the controller finds a particular GAT entry (e.g. control entry 416) indicating the physical block of the deleted data to be recovered (e.g. physical address 0), the controller may identify the previous hot count 425 of the block from the corresponding previous IGAT page 424 and compare it with the current hot count 422 of that block in the current IGAT page 420. If the two hot counts of the same physical addresses match, the controller may determine that the block was not erased or rewritten since the time the deleted data was stored, and thus that the old physical location still stores the deleted data. As a result, the controller may read the data from the old physical location in order to recover the data for the deleted file. On the other hand, if the hot counts do not match, e.g., as illustrated in the example of FIG. 4, the controller may not be able to recover the data from the old physical location since the block has been erased. However, the controller may still be able to obtain the deleted data from one or more overprovisioned blocks 426 for data recovery, as described in the examples below.

In one example, the overprovisioned blocks 426 may store invalidated data (host data) corresponding to the deleted file. As described above, when the host device overwrites cluster pool data (e.g. free clusters) corresponding to a deleted file, the data in the physical blocks previously associated with those clusters may be invalidated in GAT. If the amount of invalidated data causes a physical block to reach a compaction threshold, the controller may perform garbage collection (GC) and erase the block. As a result, the data may be unrecoverable. To address this situation, the controller may allocate one or more memory locations 112 as overprovisioned blocks 426 for backing up data and may store the invalidated data corresponding to the deleted file in these overprovisioned blocks for recovery purposes. For example, the controller may store invalidated data 428 in one or more of the overprovisioned blocks when performing GC and prior to erasing the previous physical location storing the data.

When the controller 123 stores invalidated data 428 in the overprovisioned blocks, the controller may create or update a LBA list, table, or other data structure indicating the previous logical addresses (e.g. LBA 500) associated with the invalidated data stored in each overprovisioned block. If the invalidated data is overwritten or erased from the overprovisioned block, the list of logical addresses may similarly be updated. For instance, in the example of FIG. 4, the controller may add LBA 500 to the list of logical addresses when the invalidated data 428 is stored in the overprovisioned block 426, and the controller may remove LBA 500 from the list of logical addresses if the invalidated data 428 is overwritten by other data in the overprovisioned blocks 426.

Thus, if the controller determines the current hot count 422 and previous hot count 425 do not match as described above, the controller may attempt to recover the deleted data by searching the overprovisioned blocks 426. For example, the controller may search the overprovisioned blocks by parsing the list of logical addresses in attempt to identify the deleted data. If the data is not found (e.g. the deleted data was overwritten by other data and thus the logical address list was updated to remove LBA 500), the controller may determine that the deleted file is not recoverable. Otherwise, if the data is found (e.g. the LBA list includes logical address 500), the controller may recover the deleted data from the overprovisioned block.

In another example, the overprovisioned blocks 426 may store invalidated control entries corresponding to the deleted file. As new GAT pages are created with updated control entries and previous GAT pages are invalidated, the GAT block may reach a compaction threshold, causing the controller to perform GC and erase the block with the invalidated GAT pages to make space for more GAT pages. As a result, timeline tracking of L2P mappings over a large period of time may be lost, and the controller may not be able to backtrack through the GAT 402 to identify the old physical location. To address this situation, the controller may back up the invalidated GAT pages including previous control entries 430 to the one or more overprovisioned blocks 426 when performing GC and prior to erasing the GAT block. Accordingly, when the controller attempts to backtrack through previous GAT pages, the controller may search the overprovisioned blocks in attempt to retrieve previous GAT pages or control entries. If the controller locates the previous GAT pages in the overprovisioned blocks 426, the controller may continue to perform the recovery process as described above.

In a further example, the overprovisioned blocks 426 may store invalidated data based on an erase command. In some cases, the controller 123 may receive an erase command from the host device 104 (e.g. a UNMAP, TRIM, DISCARD, or DSM operation) to free up one or more physical blocks associated with a logical address for a deleted file and to perform an erase operation in the background. Such erase commands may indicate to the controller to free up physical blocks by performing a physical erase during an idle time to improve performance when a new write command is received from the host device. When such a command is received, the controller may store the data to be erased in the overprovisioned blocks 426 to accommodate the discarded data and allow for file recovery as described above before performing the erase operation. Moreover, when attempting to recover deleted data from the overprovisioned blocks, the controller may search the overprovisioned blocks at different times depending on whether or not an erase command is received. For example, if the controller receives received a TRIM command just before the file recovery process was initiated, from the host device, the controller 123 may search the overprovisioned blocks for the data to be recovered at the beginning of the process (i.e. before backtracking through GAT pages and checking the hot counts). Alternatively, if the controller does not receive an erase command such as a TRIM command from the host device, the controller may search the overprovisioned blocks at the end of the process (i.e. after backtracking through GAT pages and checking the hot counts) as previously described.

In each of the examples described above where the controller 123 copies data from a physical location to overprovisioned blocks 426 for file recovery purposes, the overprovisioned blocks may become full. In such case, the controller may determine whether to store additional data in the overprovisioned blocks based on a priority of the data. The priority may be time-based (e.g. first-in-first-out or FIFO) or file type based. When file type based priority is used, control blocks (e.g. control entries 430) may have higher priority than data (e.g. data 428), and certain types of data 428 may be configured by the host device to have higher priority than other types of data 428. For example, data associated with a text file (.TXT, .DOC, etc.) may be configured to have lower priority than data associated with an image file (e.g. JPG, .GIF, etc.), and data associated with an image file may be configured to have lower priority than data associated with a video file (e.g. .MP4). Thus, when overprovisioned blocks 426 all become full, the controller may overwrite an overprovisioned block with higher priority information (e.g. control entries 430 or certain types of data 428), or the controller may refrain from storing or discard other types of data 428 with lower priority information. As an example, assuming invalidated data 428 is a video file, then if overprovisioned block 426 is full and currently includes text files, the controller may overwrite the data in overprovisioned block with invalidated data 428. Similarly, if a previous GAT page is subsequently being stored, the controller may overwrite invalidated data 428 in the overprovisioned block with previous control entries 430.

Thus, as described above with respect to FIGS. 3 and 4, the controller 123 may traverse the file system 302 for the deleted file, identify the starting LBA and data length for the identified file, determine whether the data has been overwritten (e.g. based on a checksum or other size comparison), and if the data has been overwritten, search through overprovisioned blocks and/or backtrack through the GAT pages and compare hot counts associated with the previous physical location to locate the data corresponding to the deleted file. The above process may occur once the controller locates the file entry corresponding to the deleted file (e.g. directory entry 322) in the file system 302. However, in some cases, rather than updating the directory entry 322 such as an in use flag 310 when a file is deleted, the host device or file system may delete the entire directory entry 322 corresponding to the deleted file. As a result, the remaining file entries may be rearranged into a new directory page which may be stored at a different physical location associated with the same logical address, while the old directory page including the deleted file entry may be invalidated in the previous physical location. In such case, the controller may not be able to find the file entry corresponding to the deleted file to perform the above process.

One way to address this problem could be to implement a version-controlled, file system backup process which stores previous directory pages whenever the controller receives a write command from the host device including a logical address within each directory page. However, if a large number of files are written, such approach may consume significant memory due to multiple directory pages being backed up, resulting in reduced efficiency and system performance during write operations.

However, the controller 123 could efficiently address this problem by using the same system described above with respect to FIG. 4. That is, the controller may locate the previous directory page including the deleted file entry based on the version-controlled system for GAT 402, hot counts in IGAT, and overprovisioning discussed above. For example, the controller may identify the control entry 408 in the current page 406 associated with the current directory page, and subsequently search or backtrack through previous GAT pages 414 to identify the control entry 416 corresponding to the root directory or subdirectory in which the deleted file entry was originally created. If the control entries 416 have not been erased or compacted, the controller may identify the previous directory page from the GAT 402; otherwise, the controller may search the overprovisioned blocks 426 in attempt to identify the control entry 430 associated with the previous directory page. After the controller locates the previous control entry 416 and identifies the physical location of the previous directory page, the controller may check the previous hot count 425 and current hot count 422 associated with that physical address to determine if the block has not been erased. If the block has been erased, the controller may search the overprovisioned blocks 426 in attempt to identify the data 428 (e.g. the previous directory page). Once the controller locates the previous directory page, the controller may traverse the previous directory page to find the deleted directory entry (e.g. directory entry 322). At this point, the controller may recover the data using the same process described previously.

Lastly, once the controller 123 ultimately locates the deleted data in the NVM 110 as described above, the controller may read the data from the invalidated physical block location and write the data to a free block (e.g. to previously erased pages) associated with a new logical address 208. Alternatively, the controller may change the control block entries (e.g. control entry 416) to revalidate the deleted data in order to read the data from the same physical location where it was previously stored. For example, the controller may modify the logical address in control entry 416 to a free logical address associated with the same physical location.

To determine the new logical address for the retrieved data and update the file system 302 accordingly, the controller may search for the allocation bitmap 307 in the root directory and parse the allocation bitmap to identify empty clusters to which the file may be written. As the allocation bitmap 307 may encompass multiple clusters, the controller may read the clusters by searching through the linked list in the FAT 306. After the controller searches through the allocation bitmap and the clusters in the FAT and confirms those free clusters are currently empty (e.g. filled with zeros), the controller may write the retrieved data to the free clusters such that other data is unaffected. The controller may write a corresponding FAT entry indicating the clusters assigned to the recovered data, and update the allocation bitmap to indicate the cluster is occupied to prevent the host device from later overwriting that cluster. The controller may also write a corresponding directory entry indicating the recovered file after searching for the next free space in the root directory following the last directory entry (by searching in multiples of directory entry length, e.g. 32 bytes). Such approach may prevent unused space between directory entries. Moreover, to speed up the searching process when the number of files in the root directory is large, the controller may perform a jump search (e.g. by exponentially skipping directory entries until the last directory entry is reached). In this way, the controller may successfully recover the deleted file.

Figure 5A:
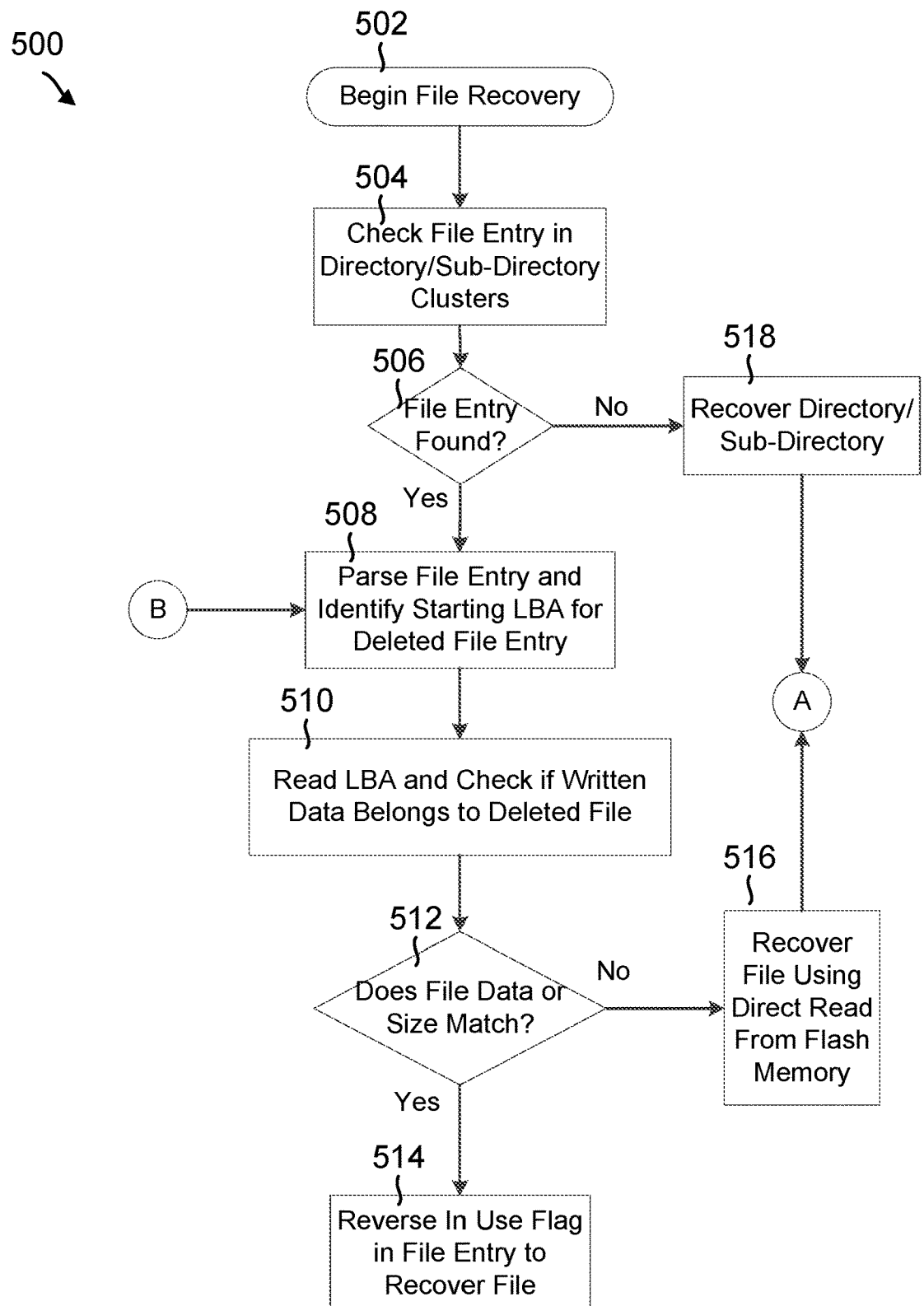
FIGS. 5A and 5B are a flow chart illustrating an exemplary method for recovering a deleted file by the storage device of FIG. 1.
Figure 5B:
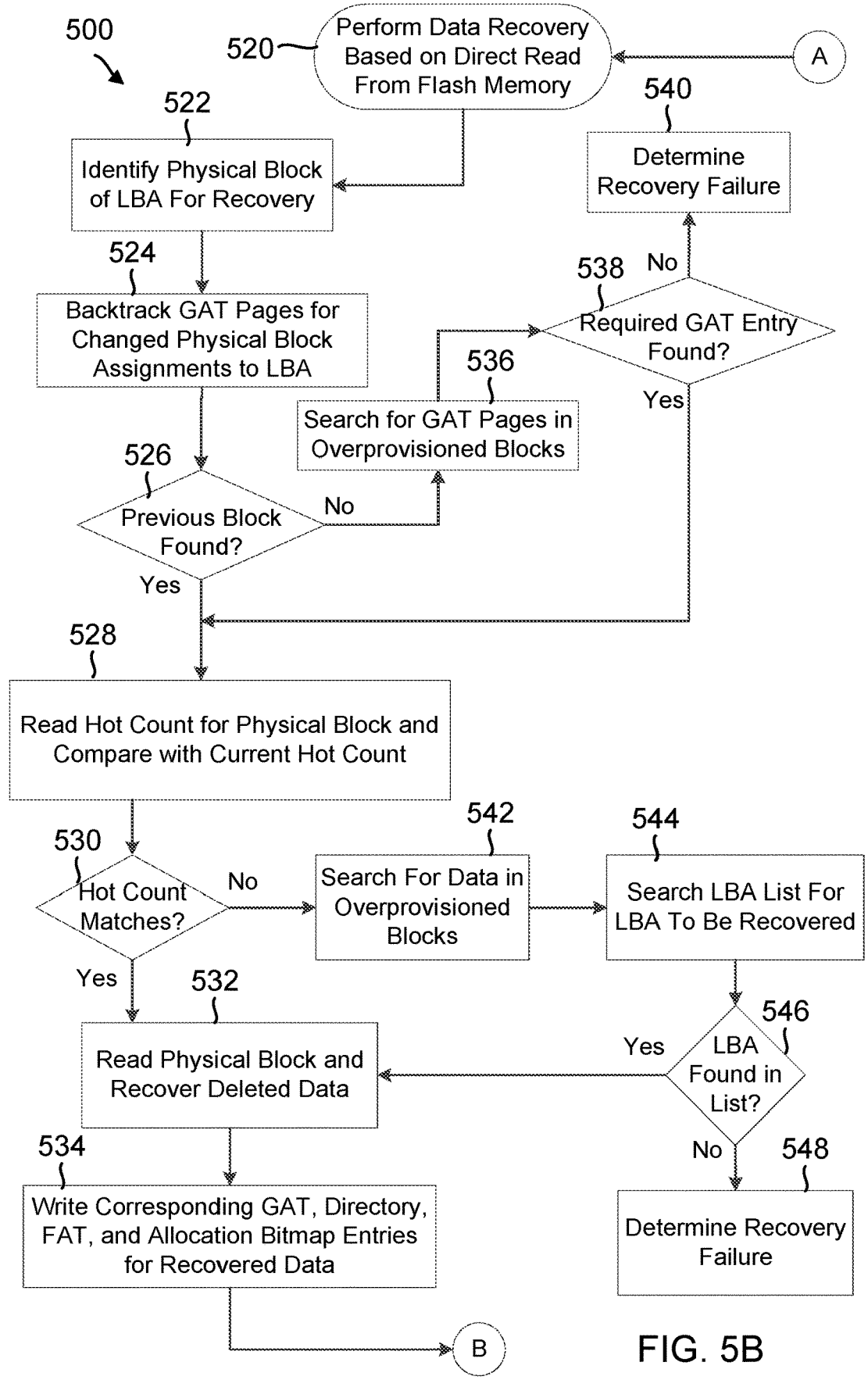

FIGS. 5A and 5B illustrate an example flow chart 500 of a method of recovering a deleted file. For example, the method can be carried out in a storage device 102 such as the one illustrated in FIG. 1. Each of the steps in the flow chart can be controlled using the controller as described below (e.g. controller 123), or by some other suitable means. The controller may begin the file recovery process, as represented by block 502 in FIG. 5A, e.g. in response to a command received by a host device 104.

Referring to FIG. 5A, as represented by block 504, the controller may check for a file entry corresponding to a deleted file in clusters storing directories or sub-directories. For example, referring to FIG. 3, the controller 123 of the storage device 102 may first parse the directories of the file system 302 to identify the file entry for the corresponding file to be recovered. For example, the controller may read the boot sector of the file system block for the various parameters that may be used to read the file system, including the cluster address where the root directory is stored. Once the controller finds the root directory based on these parameters, the controller may search through the directory entries 304 to find the file entry corresponding to the deleted file (e.g. directory entry 322).

After performing the search of the directory entries, the controller determines, as represented by block 506, whether it found the file entry. For example, referring to FIG. 3, the controller may determine whether it found directory entry 322 in the file system 302. If the controller finds the file entry, then as represented by block 508, the controller may parse the file entry and identify the starting LBA for the deleted file entry. For example, referring to FIG. 3, after the controller 123 finds the file entry (e.g. directory entry 322 corresponding to "B.TXT") in file system 302, the controller may parse that directory entry to identify the cluster or logical address of the data associated with the deleted file. For example, the controller may extract the starting LBA for the file data (i.e. first cluster 316, e.g. LBA 500 in FIG. 3) and the size of the file (i.e. data length 314, e.g. 16 KB in FIG. 3).

Next, as represented by block 510, the controller may read the LBA and check if the written data belongs to the deleted file. For example, referring to FIG. 3, the controller may check whether the file data is present and not overwritten in the extracted logical addresses. For instance, the controller may determine whether the first cluster 316 of directory entry 322 still points to data corresponding to "B.TXT" by comparing a size of the file with the clusters currently allocated to the file. As an example, the controller may determine whether the data for "B.TXT" is overwritten by comparing the data length 314 in the directory entry 322 to a total size of the clusters 318, 320 associated with first cluster 316 as described above. Alternatively, the controller may determine whether the file data is overwritten in other ways, e.g., based on a signature byte or checksum comparison.

If the controller determines as represented by block 512 that the file data or sizes match, then as represented by block 514, the controller may reverse an in use flag in the file entry to recover the file. For example, referring to FIG. 3, the controller may determine that the file data has not been overwritten, e.g. based on the size comparison discussed above or otherwise. In such case, the controller may update the corresponding file entry so that the file is visible to the host device 104 upon subsequent initialization of the storage device 102. For example, in the event the file "B.TXT" has not been overwritten at LBA 500, the controller 123 may toggle the in use flag 310 (e.g. set the bit back to 1) for directory entry 322 in order to undelete the file.

Otherwise, if the controller determines at block 512 that the file data or sizes do not match, then as represented by block 516, the controller may recover the file by directly reading the flash memory. For example, referring to FIG. 3, the controller may determine that the file data is not present, e.g. based on the size comparison discussed above or otherwise. In such case, the controller may attempt to recover the deleted file directly from the NVM 110 by searching through corresponding control block entries in the flash memory for the same logical address, as described above with respect to FIG. 4 (and restated below with respect to FIG. 5B).

Additionally, if the controller determines back at block 506 that the file entry itself was not found, then as represented by block 518, the controller may recover the directory or sub-directory similarly by directly reading from the flash memory. For example, referring to FIG. 3, in some cases, rather than updating the directory entry 322 such as an in use flag 310 when a file is deleted, the host device or file system may delete the entire directory entry 322 corresponding to the deleted file. In such case, the controller may recover the directory entry using the same system described above with respect to FIG. 4 (and restated below with respect to FIG. 5B).

Referring now to FIG. 5B, as represented by block 520, the controller performs data recovery based on a direct read from flash memory. For example, as illustrated in FIG. 3, the controller may determine that the 16 KB data corresponding to "B.TXT" at LBA 500 was invalidated as a result of the host device writing new 64 KB data for "C.TXT" at the same logical address in directory entry 324. In such case, the controller may attempt to recover the deleted file directly from the NVM 110 by searching through corresponding control block entries in the flash memory for the same logical address as described below.

As represented by block 522, the controller may identify the physical block of the LBA to be recovered. For example, referring to FIG. 4, the controller 123 may identify the physical block allocated to a particular LBA prior to the data overwrite from the GAT 402. For instance, the controller may find the previous GAT page containing the same logical address for a deleted file by reading the previous GAT pages 414 pointed by the MIP 404. The controller may backtrack GAT pages for changed physical block assignments to the LBA, as represented by block 524. For example, referring to FIG. 4, the controller may backtrack to the GAT page indicating where the physical location associated with that logical address changes for the first time. For instance, as illustrated in FIG. 4, the controller may backtrack through the previous GAT pages 414 until it finds the control entry 416 (e.g. the previous control entry) indicating the previous physical location of the deleted file associated with the identified logical address (e.g. physical address 0 for LBA 500).

If the controller determines as represented by block 526 that it found the previous block, then as represented by block 528, the controller reads the hot count for the physical block and compares the previous hot count with the current hot count. For example, referring to FIG. 4, once the controller identifies the previous physical block from the control entry 416, the controller may check whether the data is recoverable by determining whether the previous location has been erased based on a hot count corresponding to the previous physical location. For instance, once the controller finds a particular GAT entry (e.g. control entry 416) indicating the physical block of the deleted data to be recovered (e.g. physical address 0), the controller may identify the previous hot count 425 of the block from the corresponding previous IGAT page 424 and compare it with the current hot count 422 of that block in the current IGAT page 420.

If the controller determines as represented by block 530 that the hot count matches, then as represented by block 532, the controller reads the physical block and recovers the data for the deleted file. For example, referring to FIG. 4, if the two hot counts 422, 425 of the same physical address match, the controller may determine that the block was not erased or rewritten since the time the deleted data was stored, and thus that the old physical location still stores the deleted data. As a result, the controller may read the data from the old physical location in order to recover the data for the deleted file.

Accordingly, as represented by block 534, the controller may write the corresponding GAT entry, directory entry, FAT entry, and allocation bitmap entry for the recovered file. For example, referring to FIGS. 3 and 4, once the controller 123 ultimately locates the deleted data in the NVM 110 as described above, the controller may read the data from the invalidated physical block location and write the data to a free block (e.g. to previously erased pages) associated with a new logical address 208. The controller may search for the allocation bitmap 307 in the root directory and parse the allocation bitmap to identify empty clusters to which the file may be written. After the controller searches through the allocation bitmap and the clusters in the FAT and confirms those free clusters are currently empty (e.g. filled with zeros), the controller may write the retrieved data to the free clusters such that other data is unaffected. The controller may write a corresponding FAT entry indicating the clusters assigned to the recovered data, and update the allocation bitmap to indicate the cluster is occupied to prevent the host device from later overwriting that cluster. The controller may also write a corresponding directory entry indicating the recovered file after searching for the next free space in the root directory following the last directory entry (by searching in multiples of directory entry length, e.g. 32 bytes). In this way, the controller may successfully recover the deleted file.

If, however, the controller determines back at block 526 that it did not find the previous block after backtracking through the GAT pages, then as represented by block 536, the controller may search for the GAT pages in overprovisioned blocks. For example, referring to FIG. 4, as new GAT pages are created with updated control entries and previous GAT pages are invalidated, the controller may perform GC and erase the block with the invalidated GAT pages to make space for more GAT pages. As a result, timeline tracking of L2P mappings over a large period of time may be lost, and the controller may not be able to backtrack through the GAT 402 to identify the old physical location. Therefore, the controller may back up the invalidated GAT pages including previous control entries 430 to the one or more overprovisioned blocks 426 when performing GC and prior to erasing the GAT block. Thus, when the controller attempts to backtrack through previous GAT pages, if the controller does not find the previous GAT page corresponding to the deleted file, the controller may search the overprovisioned blocks in attempt to retrieve the previous GAT page or control entry.

After searching the overprovisioned blocks, if the controller determines as represented by block 538 that it found the required GAT entry, then the controller may continue to recover the file by reading hot counts as described above with respect to block 528. For example, referring to FIG. 4, if the controller locates the previous GAT pages in the overprovisioned blocks 426, the controller may continue to perform the recovery process as described above (e.g. checking whether the data is recoverable by determining whether the previous location has been erased based on a hot count corresponding to the previous physical location). Otherwise, if the controller determines at block 538 that it could not find the GAT entry even after searching the overprovisioned blocks, then as represented by block 540, the controller may determine a recovery failure since the deleted file can no longer be recovered (e.g. the data has been erased or overwritten).

Additionally, if the controller determines back at block 530 that the hot count does not match, then as represented by block 542, the controller may search for the invalidated host data in the overprovisioned blocks. For example, referring to FIG. 4, when the host device overwrites cluster pool data (e.g. free clusters) corresponding to a deleted file, the data in the physical blocks previously associated with those clusters may be invalidated, and the controller may perform GC and erase the block. Therefore, the controller may store the invalidated data 428 corresponding to the deleted file in overprovisioned blocks 426 for recovery purposes. Thus, if the controller determines the current hot count 422 and previous hot count 425 do not match as described above, the controller may attempt to recover the deleted data by searching the overprovisioned blocks 426.

When the controller searches for data in the overprovisioned blocks, as represented by block 544, the controller may search the LBA list for the LBA to be recovered. For example, referring to FIG. 4, the controller may search the overprovisioned blocks by parsing the list of logical addresses in attempt to identify the deleted data. If the controller determines as represented by block 546 that the LBA is not found in the list, then as represented by block 548, the controller may determine a recovery failure since the data has been erased or overwritten in the overprovisioned blocks. Otherwise, if the controller determines at block 546 that the LBA is found in the list, the controller may proceed to recover the file by reading the physical block and recovering the data for the deleted file as described above with respect to block 532. For example, referring to FIG. 4, if the controller determines that the data is not found in the overprovisioned blocks 426 (e.g. the deleted data was overwritten by other data and the logical address list was updated to remove LBA 500), the controller may determine that the deleted file is not recoverable. Otherwise, if the data is found in the overprovisioned blocks (e.g. the LBA list includes logical address 500), the controller may recover the deleted data from the overprovisioned block storing the data associated with that LBA.

Figure 6:
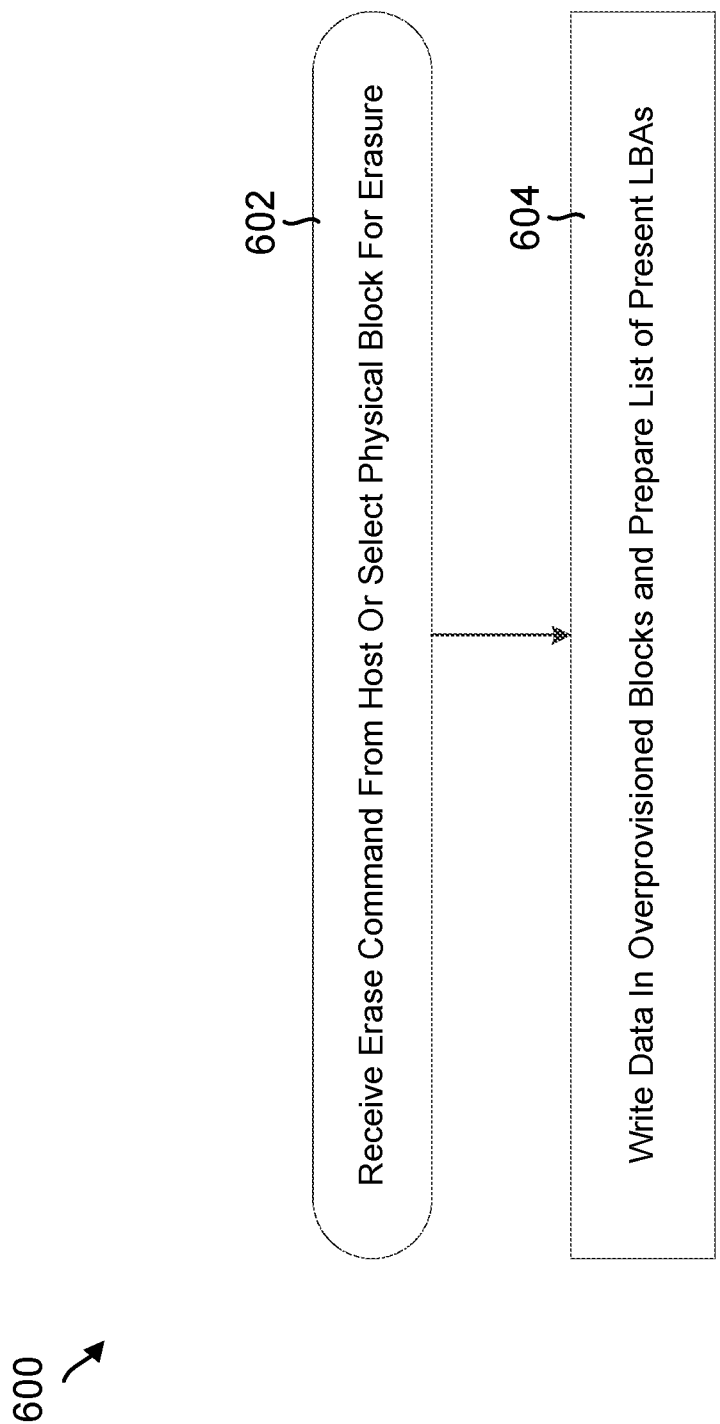
FIG. 6 is a flow chart illustrating an exemplary method for preparing a logical address list for overprovisioned blocks by the storage device of FIG. 1.

FIG. 6 illustrates an example flow chart 600 of a method of preparing a logical address list for overprovisioned blocks. For example, the method can be carried out in a storage device 102 such as the one illustrated in FIG. 1. Each of the steps in the flow chart can be controlled using the controller as described below (e.g. controller 123), or by some other suitable means.

As represented by block 602, the controller may receive an erase command from the host device or select a physical block to be erased. For example, referring to FIG. 4, the controller 123 may receive an erase command from the host device 104 (e.g. a UNMAP, TRIM, DISCARD, or DSM operation) to free up one or more physical blocks associated with a logical address for a deleted file and to perform an erase operation in the background. Alternatively, the controller may select to perform GC on a physical block prior to erasure as described above in FIG. 5B with respect to blocks 536 and 542.

In such cases, as represented by block 604, the controller may write the data in the overprovisioned blocks and prepare a list of present LBAs in the blocks. For example, referring to FIG. 4, when the controller 123 stores invalidated data 428 in the overprovisioned blocks, the controller may create or update a LBA list, table, or other data structure indicating the previous logical addresses (e.g. LBA 500) associated with the invalidated data stored in each overprovisioned block. If the invalidated data is overwritten or erased from the overprovisioned block, the list of logical addresses may similarly be updated. For instance, in the example of FIG. 4, the controller may add LBA 500 to the list of logical addresses when the invalidated data 428 is stored in the overprovisioned block 426, and the controller may remove LBA 500 from the list of logical addresses if the invalidated data 428 is overwritten by other data. The controller may afterwards search the overprovisioned blocks using the LBA list when it performs the file recovery procedure described above with respect to FIGS. 5A and 5B.

Figure 7:
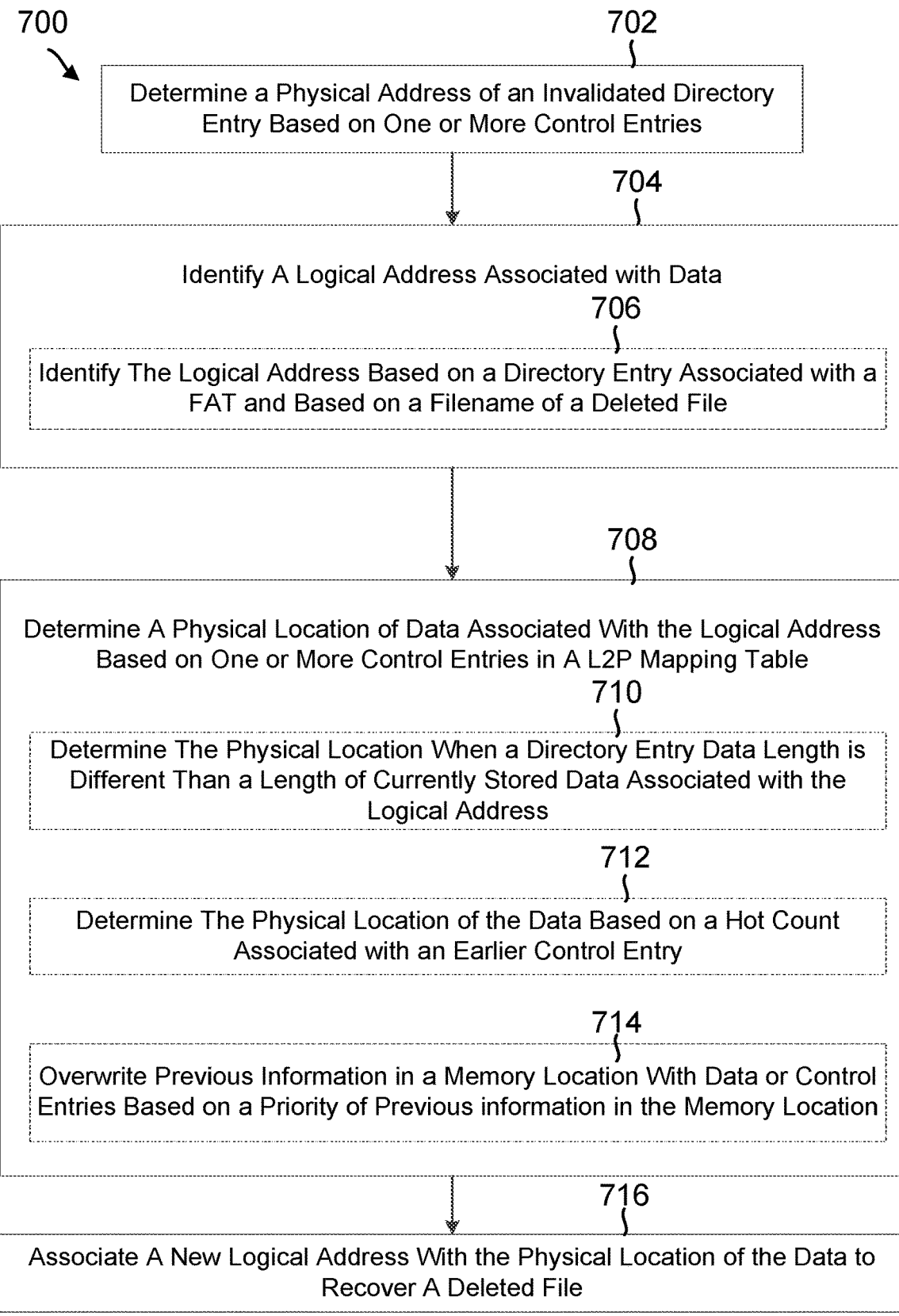
FIG. 7 is a flow chart illustrating another exemplary method for recovering a deleted file by the storage device of FIG. 1.

FIG. 7 illustrates an example flow chart 700 of a method of recovering a deleted file. For example, the method can be carried out in a storage device 102 such as the one illustrated in FIG. 1. Each of the steps in the flow chart can be controlled using the controller as described below (e.g. controller 123), or by some other suitable means. Optional aspects are illustrated in dashed lines.

As represented by block 702, the controller may determine a physical address of an invalidated directory entry based on one or more control entries prior to identifying a logical address associated with data for a deleted file. For example, referring to FIG. 5A, if the controller determines at block 506 that a file entry was not found, then as represented by block 518, the controller may recover a directory or sub-directory by directly reading from the flash memory. For example, referring to FIGS. 2-4, the controller may determine a physical address 210 of an invalidated directory entry (e.g. directory entry 322) based on control entries 408, 416 prior to identifying a logical address 208 for the deleted file.

For instance, the controller may locate a previous directory page including the deleted file entry based on the version-controlled system for GAT 402, hot counts in IGAT, and overprovisioning discussed above. For example, the controller may identify the control entry 408 in the current page 406 associated with the current directory page, and subsequently search or backtrack through previous GAT pages 414 to identify the control entry 416 corresponding to the root directory or subdirectory in which the deleted file entry was originally created. If the control entries 416 have not been erased or compacted, the controller may identify the previous directory page from the GAT 402; otherwise, the controller may search the overprovisioned blocks 426 in attempt to identify the control entry 430 associated with the previous directory page. After the controller locates the previous control entry 416 and identifies the physical location of the previous directory page, the controller may check the previous hot count 425 and current hot count 422 associated with that physical address to determine if the block has not been erased. If the block has been erased, the controller may search the overprovisioned blocks 426 in attempt to identify the data 428 (e.g. the previous directory page). Once the controller locates the previous directory page, the controller may traverse the previous directory page to find the deleted directory entry (e.g. directory entry 322). At this point, the controller may recover the data using the same process described previously.

As represented by block 704, the controller may identify a logical address associated with the data. For instance, as represented by block 706, the controller may identify the logical address based on a directory entry associated with a FAT and based on a filename of the deleted file. The directory entry may be an invalidated directory entry stored in the memory as described above with respect to block 702. For example, referring to FIG. 5A and as represented by block 504, the controller may perform a search of directory entries 304 associated with a FAT 306, and the controller may find the deleted file entry (e.g. directory entry 322) at block 506 by checking each individual filename for a match with the deleted file or based a hash value of the filename as described above. If the controller does not find the file (e.g. directory entry 322 was invalidated), then as represented by block 518, the controller may recover the invalidated directory entry by directly reading from the flash memory as described above. Once the directory is found, then as represented by block 508, the controller may parse the file entry and identify the starting LBA or logical address 208 for the deleted file or data 119. For example, the controller may extract the starting LBA for the file data (i.e. first cluster 316, e.g. LBA 500 in FIG. 3) and the size of the file (i.e. data length 314, e.g. 16 KB in FIG. 3).

As represented by block 708, the controller may determine a physical location of the data associated with the logical address based on one or more control entries in a L2P mapping table. For example, referring to FIG. 5B and as represented by block 522, the controller may identify the physical block of the LBA to be recovered. For example, referring to FIG. 4, the controller 123 may identify the physical location (e.g. memory location 112 corresponding to physical address 0) associated with the logical address 208 prior to the data overwrite (e.g. LBA 500) based on one or more previous control entries 416 in the GAT 402.

As represented by block 710, the controller may determine the physical location of the data when a data length provided in the directory entry is different than a length of currently stored data associated with a range of logical addresses including the identified logical address. For example, referring to FIG. 5A and as represented by block 510, the controller may read the LBA and check if the written data belongs to the deleted file. For instance, referring to FIG. 3, the controller may determine whether the first cluster 316 (e.g. the identified logical address) of directory entry 322 still points to data corresponding to "B.TXT" by comparing a size of the file with the clusters (e.g. the range of logical addresses) currently allocated to the file. As an example, the controller may determine whether the data for "B.TXT" is overwritten by comparing the data length 314 in the directory entry 322 to a total size or length of the clusters 318, 320 currently storing data associated with first cluster 316 as described above. If the controller determines at block 512 that the file data or sizes do not match, then as represented by block 516, the controller may recover the file by directly reading the flash memory (including identifying the physical block of the LBA for recovery at block 522 of FIG. 5B).

The one or more control entries in the L2P mapping table may include a current control entry associated with the logical address, and a previous control entry. For example, referring to FIG. 4, the GAT 402 may include a current control entry for logical address 500 (e.g. control entry 408 in current page 406), and one or more previous control entries for the same logical address (e.g. control entry 416 in previous page 414). The controller may determine the physical location of the data based on the previous control entry. For instance, referring to FIG. 5B, the controller may backtrack GAT pages for changed physical block assignments to the LBA, as represented by block 524. For example, referring to FIG. 4, the controller may backtrack to the GAT page indicating where the physical location associated with that logical address changed for the first time. For instance, as illustrated in FIG. 4, the controller may backtrack through the previous GAT pages 414 in GAT 402 until it finds the control entry 416 (e.g. the previous control entry) indicating the previous physical location of the deleted file associated with the identified logical address (e.g. physical address 0 for LBA 500).

Moreover, as represented by block 712, the controller may determine the physical location of the data based on a hot count associated with the previous control entry. For example, referring to FIG. 5B, as represented by block 528, the controller may read the hot count for the physical block and compare the previous hot count with the current hot count. If the controller determines as represented by block 530 that the hot count matches, then as represented by block 532, the controller may read the physical block and recover the data for the deleted file. For instance, referring to FIG. 4, once the controller identifies the previous physical block from the control entry 416, the controller may check whether the data is recoverable by determining whether the previous location has been erased based on a hot count corresponding to the previous physical location. For example, once the controller finds a particular GAT entry (e.g. control entry 416) indicating the physical block of the deleted data to be recovered (e.g. physical address 0), the controller may identify the previous hot count 425 of the block from the corresponding previous IGAT page 424 and compare it with the current hot count 422 of that block in the current IGAT page 420. If the hot counts 422, 425 of the two physical addresses match, the controller may determine that the block was not erased or rewritten since the time the deleted data was stored, and thus that the old physical location still stores the deleted data. On the other hand, if the controller determines at block 530 that the hot count does not match, then as represented by block 542, the controller may search for the invalidated host data in the overprovisioned blocks. For example, referring to FIG. 4, the controller may search the overprovisioned blocks 426 by parsing the list of logical addresses in attempt to identify the deleted data. If the controller determines that the data is found in the overprovisioned blocks (e.g. the LBA list includes logical address 500), the controller may recover the deleted data from the overprovisioned block storing the data associated with that LBA.

At least one of the data or the one or more control entries may be stored in a memory location of the memory that is overprovisioned for invalidated information. The invalidated information includes invalidated data and invalidated control entries. For example, referring to FIG. 4, the overprovisioned blocks 426 (e.g. memory locations 112 that are overprovisioned for back up data for data recovery) may store invalidated data 428 and/or invalidated control entries 430.

Moreover, as represented by block 714, the controller may overwrite previous information in the memory location with the at least one of the data or the one or more control entries based on a priority of the previous information. The previous information includes previous invalidated data or previous invalidated control entries originally stored in the overprovisioned memory location. For example, referring to FIG. 4, when the controller 123 copies data from a physical location to overprovisioned blocks 426 for file recovery purposes, the overprovisioned blocks may become full. In such case, the controller may determine whether to store additional data in the overprovisioned blocks based on a priority of the data. The priority may be time-based (e.g. first-in-first-out or FIFO) or file type based. When file type based priority is used, control blocks (e.g. control entries 430) may have higher priority than data (e.g. data 428), and certain types of data 428 may be configured by the host device to have higher priority than other types of data 428. Thus, the controller may overwrite an overprovisioned block with higher priority information (e.g. control entries 430 or certain types of data 428), or the controller may refrain from storing or discard other types of data 428 with lower priority information. As an example, assuming invalidated data 428 is a video file, then if overprovisioned block 426 is full and currently includes text files, the controller may overwrite the data in overprovisioned block with invalidated data 428. Similarly, if a previous GAT page is subsequently being stored, the controller may overwrite invalidated data 428 in the overprovisioned block with previous control entries 430.

Finally, as represented by block 716, the controller may associate a new logical address with the physical location of the data to recover the deleted file. For example, referring to FIG. 5B and as represented by block 534, the controller may write a corresponding GAT entry, directory entry, FAT entry, and allocation bitmap entry for the recovered file. For example, referring to FIGS. 3 and 4, once the controller 123 ultimately locates the deleted data in the NVM 110 as described above, the controller may read the data from the invalidated physical block location and write the data to a free block (e.g. to previously erased pages) associated with a new logical address 208. The controller may write a corresponding FAT entry indicating the clusters assigned to the recovered data, and update the allocation bitmap to indicate the cluster is occupied to prevent the host device from later overwriting that cluster. The controller may also write a corresponding directory entry indicating the recovered file.

Accordingly, the present disclosure allows for recovery of data that the user may accidentally delete from the storage device, and which is overwritten by the host device with data from another file at the same logical address, by reading the physical blocks in the flash memory. Backup copies of control data present in the file system (e.g. to overprovisioned blocks) may be created to further improve the recovery process. Furthermore, the contents of a file or folder may be modified (e.g. compressed or encrypted) without external hardware requirements by allowing the controller to directly access the data in the flash memory using a similar process of accessing file data using a filename. Additionally, files may be recovered in response to erase commands (e.g. TRIM/DISCARD) received from the host device.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
a memory storing data associated with a deleted file; and
a controller configured to identify a logical address associated with the data, to determine a physical location of the data associated with the logical address based on one or more control entries in a logical-to-physical (L2P) mapping table, and to associate a new logical address with the physical location of the data to recover the deleted file, and to modify the L2P mapping table to reflect the association of the new logical address with the physical location of the data.

2. The storage device of claim 1, wherein the controller is further configured to identify the logical address based on a directory entry associated with a File Allocation Table (FAT) and based on a filename of the deleted file.

3. The storage device of claim 2, wherein the controller is further configured to determine the physical location of the data when a data length provided in the directory entry is different than a length of currently stored data associated with a range of logical addresses including the identified logical address.

4. The storage device of claim 2, wherein the directory entry is an invalidated directory entry stored in the memory, and the controller is further configured to determine a physical address of the invalidated directory entry based on the one or more control entries prior to identifying the logical address associated with the data for the deleted file.

5. The storage device of claim 1, wherein the one or more control entries in the L2P mapping table include a current control entry associated with the logical address and a previous control entry, wherein the controller is further configured to determine the physical location of the data based on the previous control entry.

6. The storage device of claim 5, wherein the controller is further configured to determine the physical location of the data based on a hot count associated with the previous control entry.

7. The storage device of claim 1, wherein at least one of the data or the one or more control entries are stored in a memory location of the memory that is overprovisioned for invalidated information.

8. The storage device of claim 7, wherein the controller is configured to overwrite previous information in the memory location with the at least one of the data or the one or more control entries based on a priority of the previous information.

9. A storage device, comprising:
a memory storing data associated with a deleted file; and
a controller configured to identify a logical address associated with the data based on a directory entry associated with a File Allocation Table (FAT), to determine a physical location of the data associated with the logical address based on one or more control entries in a logical-to-physical (L2P) mapping table, and to associate a new logical address with the physical location of the data to recover the deleted file;
wherein the one or more control entries in the L2P mapping table include a current control entry associated with the logical address and a previous control entry, and wherein the controller is further configured to determine the physical location of the data based on the previous control entry.

10. The storage device of claim 9, wherein the controller is further configured to identify the logical address based on a filename of the deleted file.

11. The storage device of claim 9, wherein the controller is further configured to determine the physical location of the data when a data length provided in the directory entry is different than a length of currently stored data associated with a range of logical addresses including the identified logical address.

12. The storage device of claim 9, wherein the directory entry is an invalidated directory entry stored in the memory, and the controller is further configured to determine a physical address of the invalidated directory entry based on the one or more control entries prior to identifying the logical address associated with the data for the deleted file.

13. The storage device of claim 9, wherein at least one of the data or the one or more control entries are stored in a memory location of the memory that is overprovisioned for invalidated information.

14. The storage device of claim 13, wherein the controller is configured to overwrite previous information in the memory location with the at least one of the data or the one or more control entries based on a priority of the previous information.

15. A storage device, comprising:
a memory storing data associated with a deleted file; and
a controller configured to identify a logical address associated with the data based on a directory entry associated with a File Allocation Table (FAT), to determine a physical location of the data associated with the logical address based on one or more control entries in a logical-to-physical (L2P) mapping table, and to associate a new logical address with the physical location of the data to recover the deleted file;
wherein the one or more control entries in the L2P mapping table include a current control entry associated with the logical address and a previous control entry, and wherein the controller is further configured to determine the physical location of the data based on the previous control entry and based on a hot count associated with the previous control entry.

16. The storage device of claim 15, wherein the controller is further configured to identify the logical address based on a filename of the deleted file.

17. The storage device of claim 15, wherein the directory entry is an invalidated directory entry stored in the memory, and the controller is further configured to determine a physical address of the invalidated directory entry based on the one or more control entries prior to identifying the logical address associated with the data for the deleted file.

18. The storage device of claim 15, wherein at least one of the data or the one or more control entries are stored in a memory location of the memory that is overprovisioned for invalidated information.

19. The storage device of claim 18, wherein the controller is configured to overwrite previous information in the memory location with the at least one of the data or the one or more control entries based on a priority of the previous information.

* * * * *